United States Patent

[11] 3,539,030

[72] Inventor Jacques Jean-Marie Jules Gerin
Chatellenot Pouilly-en-Auxois (Cote d'Or), France
[21] Appl. No. 742,005
[22] Filed July 2, 1968
[45] Patented Nov. 10, 1970
[32] Priority July 5, 1967
[33] France
[31] 113,211

[54] HIGH SAFETY MOTOR VEHICLES
8 Claims, 16 Drawing Figs.

[52] U.S. Cl. .................................. 180/89, 296/28, 280/6.1
[51] Int. Cl. .................................. B60r 21/00, B62d 35/00
[50] Field of Search .................................. 180/89; 296/1, 28; 280/87, 96.2, 6.1, 6.11, 112, 6

[56] References Cited
UNITED STATES PATENTS
2,036,560 4/1936 Backus .................................. 296/1

| | | | |
|---|---|---|---|
| 2,903,295 | 9/1959 | Brahmstedt .................. | 296/1 |
| 3,298,707 | 1/1967 | Gerin .......................... | 280/87 |

FOREIGN PATENTS

| | | | |
|---|---|---|---|
| 1,387,858 | 12/1964 | France ......................... | 280/112 |
| 701,538 | 1/1941 | Germany ..................... | 296/1 |
| 400,467 | 10/1933 | Great Britain ............... | 296/1 |

Primary Examiner—Kenneth H. Betts
Attorney—Karl W. Flocks

ABSTRACT: High safety motor vehicle comprising a body of tapered shape, the front part forming the large end of which is well rounded, the master couple of which is placed substantially in the first third of the total length of the vehicle, the most satisfactory position to obtain a least resistance of air to forward motion, the front end of which is occupied by the spare wheel which is mounted on a shaft firmly secured to the vehicle and is combined with two side shields very strong and resistant in the horizontal plane, smooth and devoid of asperities.

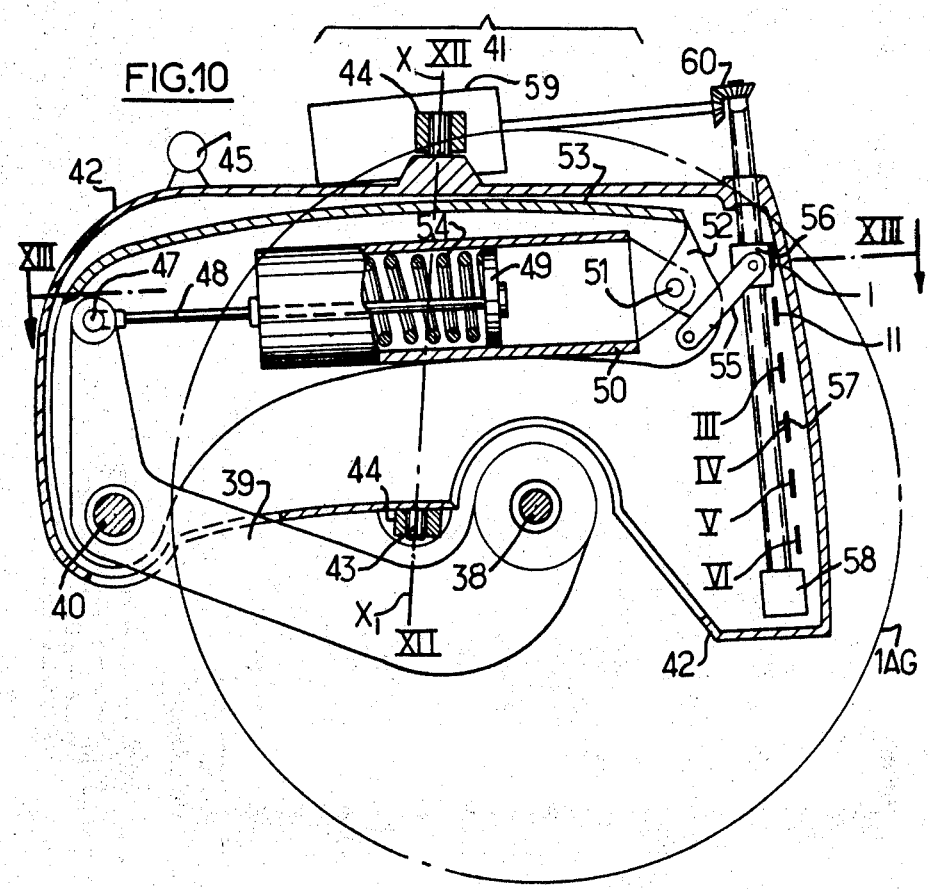
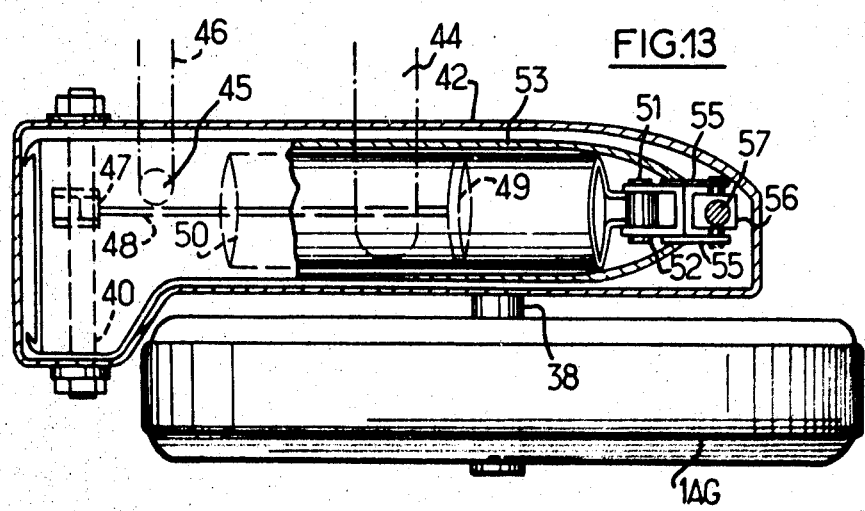

HIGH SAFETY MOTOR VEHICLES

The present invention has for object to reduce, or even totally eliminate, the disastrous consequences of certain present characteristics of motor vehicles and to provide novel advantages therefor.

It appears in fact of importance to applicant to recall to mind before anything else, the necessity of facing realities, and that it would in particular be useless to oppose the deep-seated and constant tendency which has always incited man to travel as rapidly as possible. The motor car does not escape this fundamental rule.

It must be observed that this means of transport, more particularly on speed-ways, is now driven by the average motorist twice as quickly as the corresponding vehicle by the preceding generation.

Now, if the satisfactory solutions offered by automobile technique reduce to a certain extent the risks of accident, it is none the less a fact that a chance incident giving rise to injury at high speed has extremely serious results.

Since kinetic energy increases with the square of the speed, one is confronted with the complete impossibility of safeguard in the case of impact, as soon as a car, even of relatively small weight, moves at the speeds attained at present by all car drivers.

It is consequently impossible to hope escaping the most serious results of an impact.

The present invention proposes first of all to eliminate the possibility of direct frontal shocks, by constructing the vehicle according to indisputable technical rules and constituting the synthesis of certain of applicant's prior patent, in particular French Pat. Nos. 1,412,389, 1,194,538 and 1,276,163.

It is thus, in particular, that the invention aims at a very solid motor vehicle without excessive weight, specially possessing very rounded shapes at the front and tapering backwards, locally very resistant and smooth, the extreme front of which is constituted by the spare wheel.

The vehicle according to the invention is mainly characterized by a taper-shaped body of which the front part forming the large and is well rounded both in the horizontal and vertical planes, the master couple of which is placed substantially in the first third of the total length of the vehicle, the most satisfactory position for obtaining a least resistance of air to forward motion, the front end of which is occupied by the spare wheel which is mounted on a vertical shaft firmly secured to the vehicle and is combined with two side shields very strong and resistant in the horizontal plane, smooth and devoid of asperities, of which the two front wheels are combined with the front rounded part as a unit of the vehicle, whereas the two rear wheels are, on the contrary, separate from the rear tapered part and housed in side stream-lined bodies which are connected to and combined with the whole by means of shaped appendages.

This novel architecture, judiciously reinforced, permits of placing the two front passengers entirely in the first third of the vehicle. Completely protected and in great safety due to the side shields, the two front passengers are at ease since, placed on a level with the master couple, they enjoy excellent visibility and further, the two thirds of the length of the vehicle are entirely freed.

Frontal shocks are eliminated since, in the case of a collision, the vehicle according to the invention does not crash against the obstacle, but slides against it, rebounds and is flung to one side. Thus flung aside, the vehicle pursues its course, but its speed is already considerably reduced and the driver may then progressively slow down and stop after having avoided the irreparable impact against the obstacle, whether the latter be more-over stationary or movable.

The advantages recalled above of the vehicle according to the invention may be defined in the following principal characteristic:

The front seats of the vehicle are placed slightly in front of the axle, or more generally of the immaterial axis connecting the centres of the two front wheels, which renders available a very substantial space in the two remaining thirds of the vehicle length so as to place a seat very far back and folding seats in the central part, the engine being placed in front of the axles of the rear wheels.

The attachment at the extreme front end of the seats of the two main occupants of the vehicle presents nothing but advantages.

Indeed, the weight of the driver at the minimum is added to those of the antishock spare wheel and of its mounting as well as those of the two side protective shields; this relatively heavy unit being placed in front of the axle of the front wheels, the result is that the centre of gravity of the vehicle is greatly to the fore.

This position of the centre of gravity is very favourable to the realization of satisfactory road-holding qualities and satisfactory mechanical stability of the vehicle. To this is added the other principal advantage of the novel architecture of the vehicle according to the invention, viz., its excellent aerodynamism due to the perfectly tapered shape of the accomodation space up to the rear point of the vehicle.

The combination of a sufficient front distribution of the weight of the vehicle with excellent aerodynamism has for result that the drag centre and the pressures centre are placed distinctly behind the centre of gravity and that the vehicle is comparable to a weather-cock and subsequently rendered nearly wholly insensible to the particularly disastrous and dangerous action of leading winds.

The aerodynamism of the vehicle is reinforced by the fact the two rear glass windows of the coachwork form between them a semi-vertical ridge, whereas the stream-lined shapes of the rear wheel end in vertical ridges.

For extremely rapid vehicles, the aerodynamic stability is further improved by means of three light ailerons two of which are placed above the stream-linings of the rear wheels and one above the rear point of the central body of the vehicle.

The consequence, even on a car of small total length, of the possibility of placing a very substantial movable load is the obligation of adapting the suspension system to these very different weights respectively corresponding to running empty with only the driver and full load running with all the places occupied and fully loaded with luggage, the overload in such a case being capable of increasing by 60 percent relative to empty load.

To this end, the vehicle according to the invention is provided with an adjustable suspension device which may, between its extreme high and low positions, occupy a certain number of intermediate positions corresponding to various possible uses of the vehicle, these different positions being ensured by contactors electrically connected to contact studs of a stationary element along which the driver may displace a small control lever, the earthing being effected by a similar series of contact studs in engagement with the first ones of a movable element which the driver may displace relative to the stationary element by means of a second handle, thus modifying the areas of the possible adjustments of the suspension as a function of the load of the vehicle.

According to another characteristic, there is provided an automatic pendulum device controlling the adjustable suspension device in turnings and upon braking.

According to further characteristics of the invention:

The coachwork of the vehicle is composed of two complementary separate elements: one front element and one rear element which may be manufactured in different workshops and then transported in a particularly easy manner and, finally, mounted in an assembly workshop.

The front element of the coachwork comprises the fore compartment up to and including the main couple as well as the substructure of the rear element, which permits of readily transporting half a dozen encased one in the other on the platform of a trailer or wagon.

Other characteristics and advantages of the present invention will be obvious from the following description with reference to the accompanying drawings showing, diagrammatically and merely by way of example, different possible embodiments of said invention.

In these drawings

FIGS. 7 and 8 are detail views in perspective on a larger scale showing diagrammatically the framework of the front part and rear part of a vehicle according to the invention.

FIGS. 10 and 11 are detail views in elevational section of an adjustable suspension device which is preferably utilized on the vehicle according to the invention, the said device being shown in two different operating positions.

FIG. 13 is a plan view in section along line XIII–XIII of FIG. 10.

Figure 1:
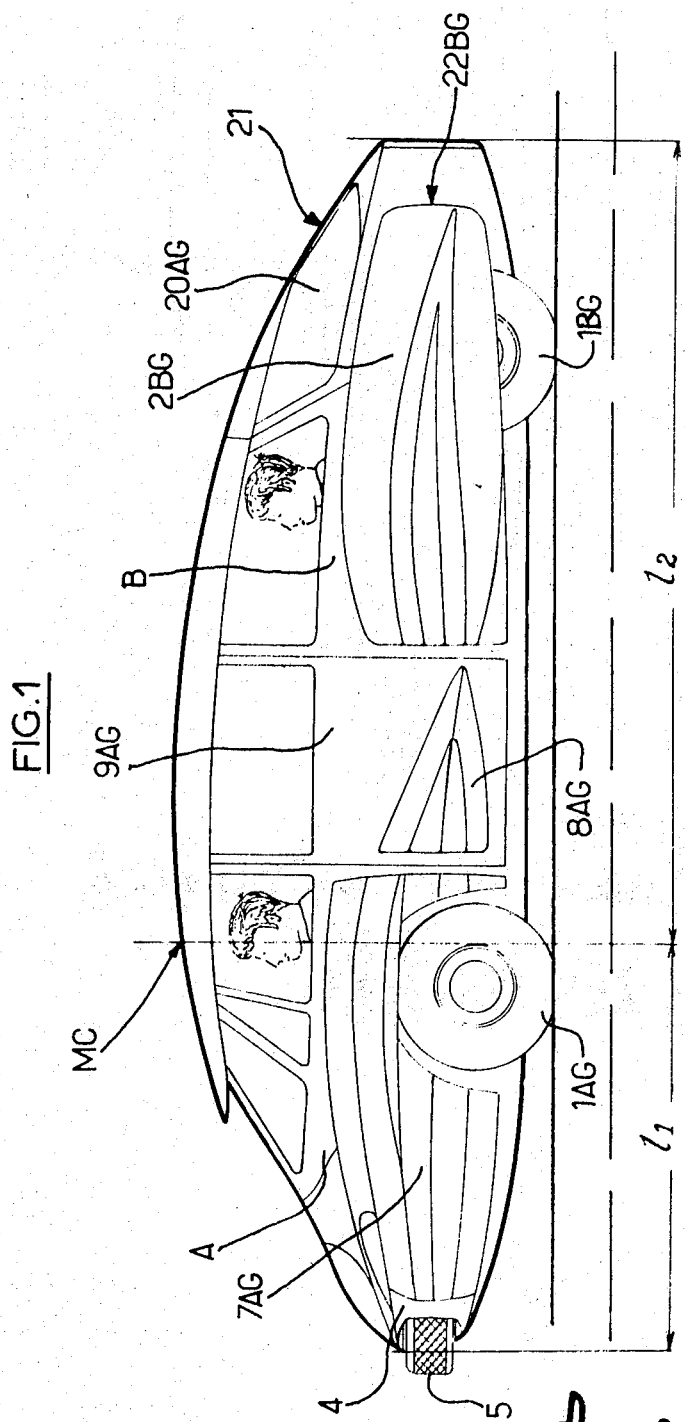
FIG. 1 is a view in elevation of a motor vehicle according to the invention.
Figure 2:
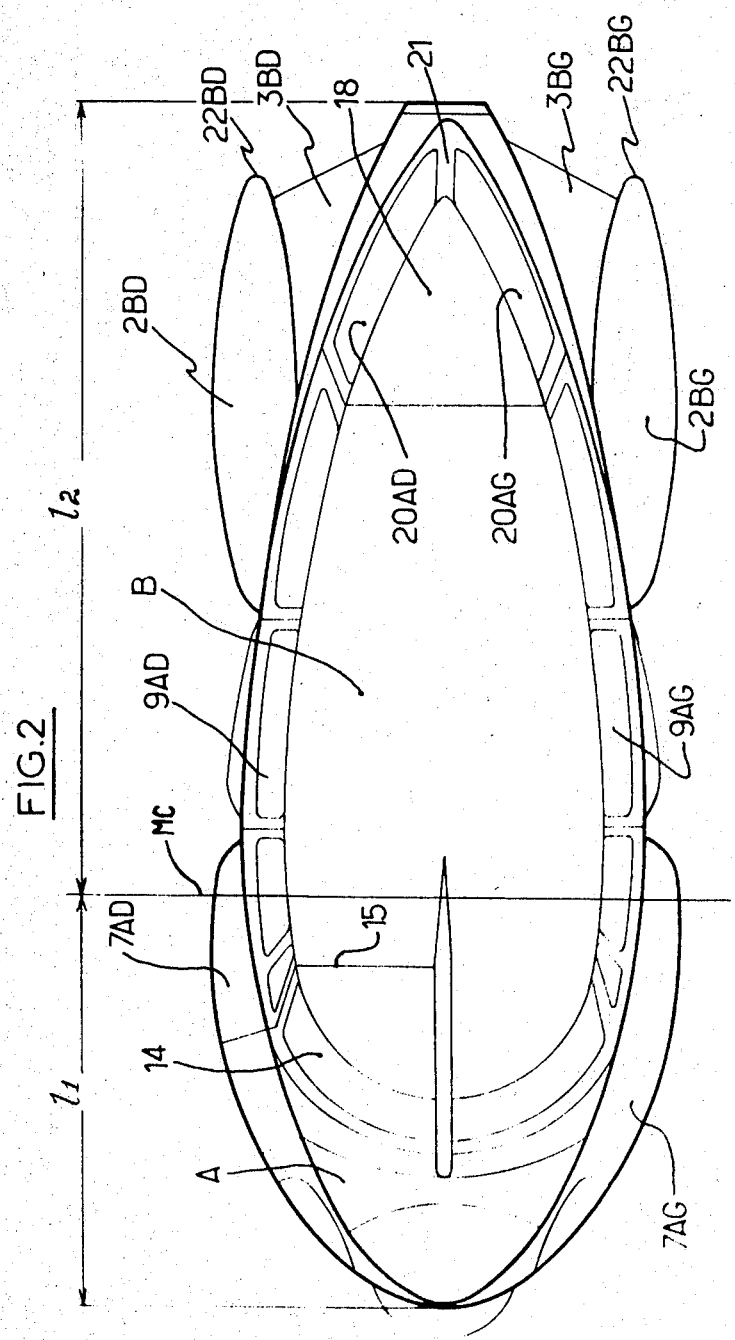
FIG. 2 is a plan view thereof.
Figure 3:
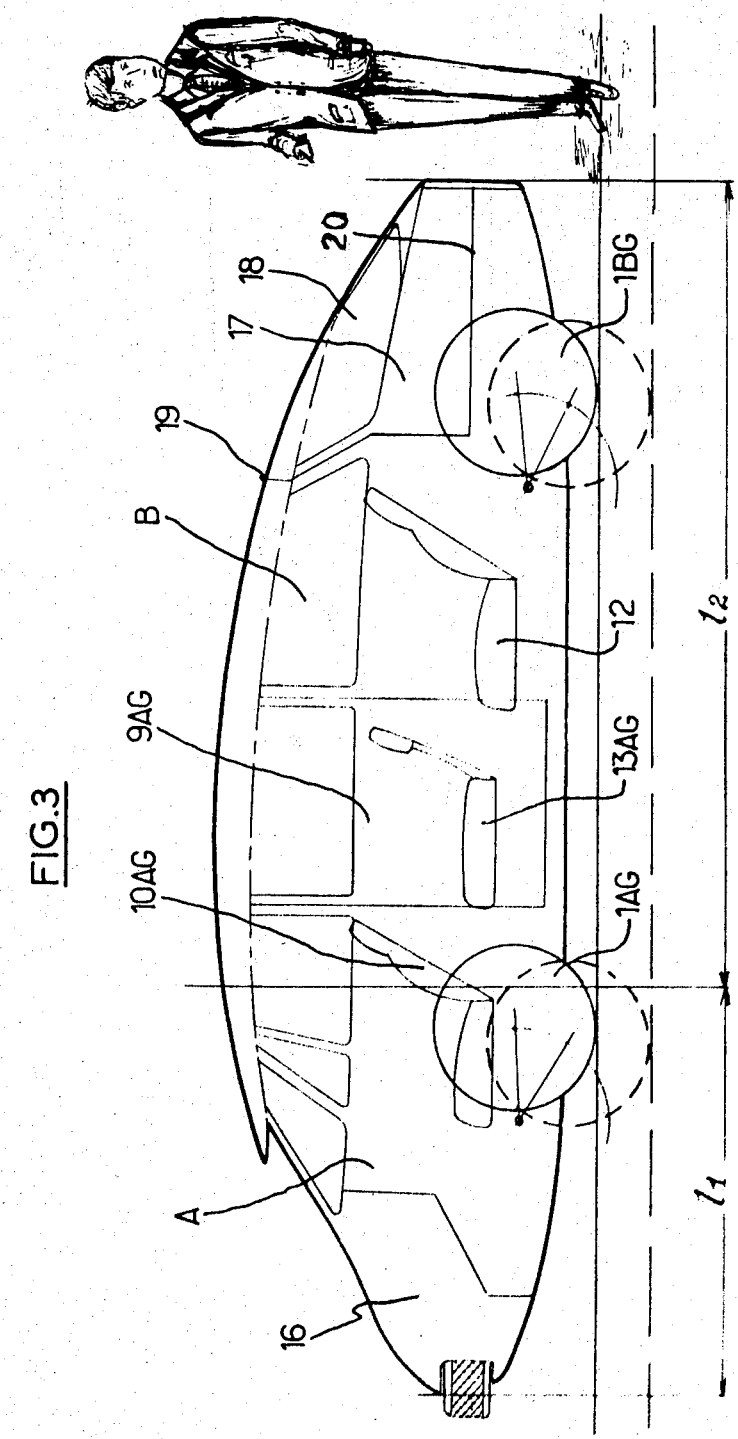
FIGS. 3 and 4 are space diagrams of the vehicle, seen respectively in the vertical plane and the horizontal plane.
Figure 4:
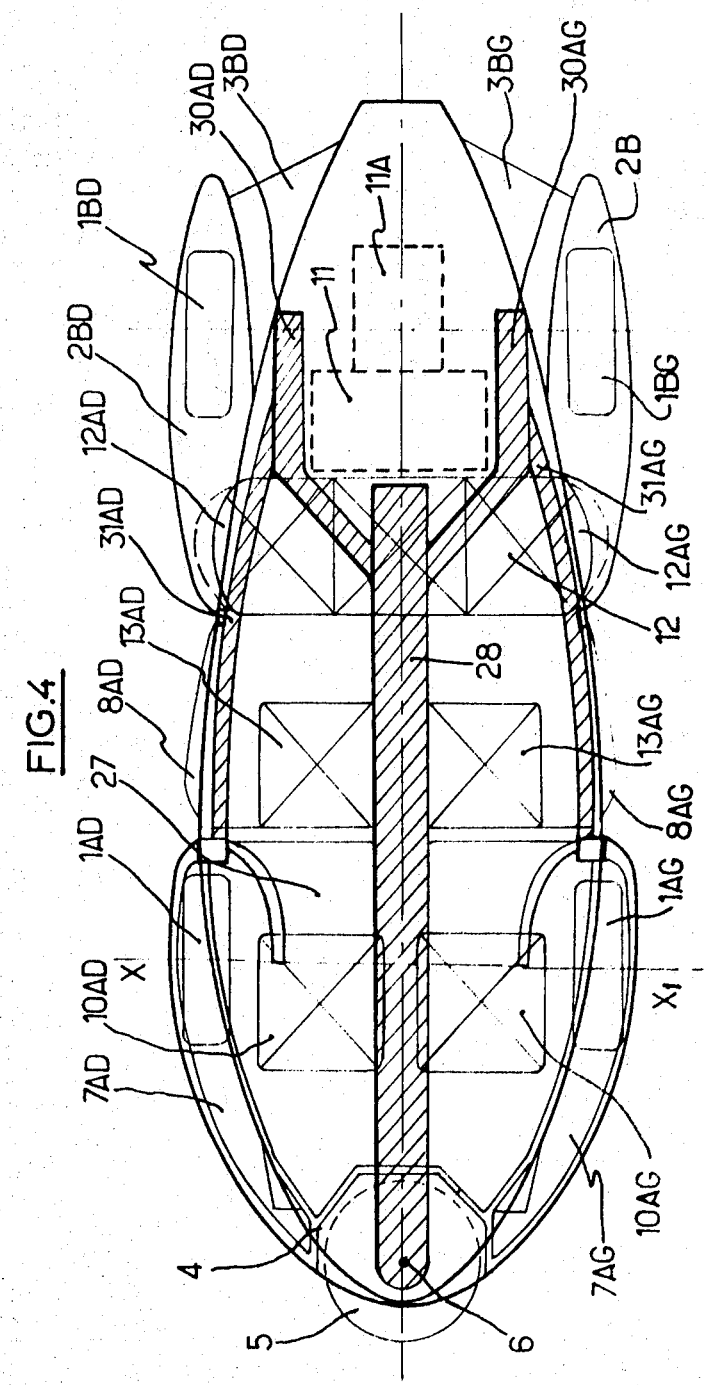

It will be seen at once from a reference to FIGS. 1 to 5 that the vehicle according to the invention presents a correctly designed shape from the aerodynamic point of view. Its front part, designated by the general reference A, which constitutes the large end of the body, is well rounded, both in the vertical plane, as is seen in FIGS. 1 and 3, and in the horizontal plane, as is seen in FIGS. 2 and 4. The master couple MC of the main body is placed at a distance $l_1$ from the front of the vehicle which is substantially at a third of the total length of the vehicle.

The middle and rear parts of the vehicle, designated by the general reference B, which occupy the two remaining thirds $l_2$ of the vehicle, have, contrary to the front part, a tapered shape ending substantially at the tail.

It will also be noted that the two front wheels 1AG and 1AD combine with the design as a whole of the front rounded part A whereas the two rear wheels 1BG and 1BD are, on the contrary, separated from the rear tapered part B. These rear wheels which are thus outside the main mass (see in particular FIGS. 2 and 4) are housed in corresponding stream-linings 2BG and 2BD which are connected to the main body and combined with the unit by means of shaped appendages 3BG and 3BD, as is seen in FIGS. 2 and 4.

It is important to note that the whole length of the vehicle is utilized so as to realize in the best possible manner satisfactory penetration in the air. The front, compartment, which in conventional cars contains the engine or constitutes the luggage boot, is here included in the unit mass.

This satisfactory aerodynamic penetration shape has the principal advantage of further corresponding to what one may call a "nongrappling" shape in the case of an accident.

As already stated in applicant's prior patents, in particular French Pat. Nos. 1,276,163, 1,194,538 and 1,412,389. the rounded shape A has its extreme front end 4 (see particularly FIGS. 1 and 4) replaced and occupied by the spare wheel 5 which is mounted on a vertical shaft 6 firmly secured to the vehicle.

The wheel 5, which may be visible as shown in the drawings or, on the contrary concealed by a light stream-lining destructible in the event of impacts, is integrated in an assembly of two side shields 7AG and 7AD constituted by elements both resistant and strong in the horizontal plane, which is the one in which arise shocks and impacts in the case of an accident, smooth and devoid of asperities. These side shields, which form a whole with the front part A of the vehicle, comprise tapered extensions 8AG, 8AD on the middle part of the vehicle, where, as will be explained in detail further on, are disposed side doors 9AG, 9AD.

In order not uselessly to overtax the description of the present application, no detail will be given regarding the composition itself of the shields since it suffices, in order to obtain this information, to refer to the previously mentioned patents.

According to an important characteristic of the present invention, this "nongrappling" shape particularly resistant will permit of placing in all safety, and this contrarily to conventional vehicles, persons in the extreme front end of the vehicle.

Indeed, these persons, due to the conception itself of the vehicle, will be much more fully protected and much more effectively than the passengers and drivers usually seated at the centre or the back of a conventional motor vehicle which is deprived of any solid and efficient protection.

Moreover, in order to ensure efficient protection for the occupants of the rear seats of the car, there is provided on each side of the rear seat 12 (see FIGS. 4 and 5) a very solid shield similar to the ones provided in front. Each of these rear shields constitutes the front part of the enveloping wings of the rear wheels 1BG, 1BD. It is thus seen that the passengers of the rear seat 12 are as well protected from side shocks as the passengers of the two seats 10AG, 10AD.

Furthermore, the two wings 2BG, 2BD permit of increasing the usual inner width of the vehicle. It is thus that the rear seat 12 overlaps the main body in the wings and that an elbow-rest 12AG, 12AD may be provided giving a great inner width of the vehicle without for that matter increasing the width of the main body of the vehicle.

From a practical point of view, a motor vehicle in everyday use, such as the one here proposed, will advantageously comprise (see in particular FIGS. 3 and 4) two front seats 10AG, 10AD placed slightly in front of the axle or more generally of the immaterial axis XX, connecting the centres of the two front wheels.

It follows that the main occupants, that is to say the driver and his neighbour, are perfectly protected both in front and sideways and placed substantially at the greatest width of the main body of the vehicle because on a level with the master couple.

This essential possibility of the invention of placing the two passengers on a level with the greatest width, that is to say in the front third of the length of the vehicle has for consequence the possibility of disposing, on the remaining length $l_2$, of a very large available space.

This latter permits of placing the motive power 11 at the extreme rear end of the vehicle and the rear seat 12 for three passengers.

One finally disposes of a very great entirely available space, even for a vehicle of small length, which may be employed either for folding seats 13AG, 13AD, or for placing therein an appreciable quantity of luggage after folding back the folding seats. Access both to the rear seats and to the folding seats is very easy in view of the side doors 9AG, 9AD, which also permit very easy loading of luggage, should the central part be employed for this purpose.

Access to the front seats is had, either by passing between the two front seats 10AG, 10AD, or through the agency of a third door 14 (FIG. 2) which opens by pivoting about a shaft 15 substantially horizontal, carrying with it half the windscreen. In this way one may have access to the front seats without having to open doors outwardly, which is often the cause of unfortunate accidents and annoyances if one is in close juxtaposition in a parking.

Due to the special conception of the vehicle according to the invention, one moreover disposes of two spaces for luggage boots viz., a front space 18, above the spare wheel 5 and a rear space 17, above the engine compartment, the cover 18 of which comprising the rear window may pivot about a shaft 19.

It is obvious that it will be advantageous to make use, for the engine 11, of an engine of the type with flat opposed cylinders or, at a stretch, of the strongly inclined transverse type, so as to dispose of the maximum free space to constitute the boot 17. Moreover, the gear-box 11A will be overhung in the extreme rear part of the coachwork.

The vehicle according to the invention has further the advantage in that it may easily be transformed into, or conceived as, a break or a very spacious vehicle for various purposes, due to the ease of introduction of the goods either by the side doors 9AG, 9AD which then slide, or by the door 18 of the rear boot 17, the back of the rear seat 12 folding back according to the well-known technique in order to provide a luggage-carrying platform.

Moreover, the engine compartment is covered with a removable floor 20 so as to be able to reach the engine 11 and its accessories in case of need.

It is to be noted that the conception of the vehicle according to the invention, with the two main passengers placed very much to the fore of the vehicle, the presence of the relatively heavy attachment system of the anti-shock spare wheel 5 and of the two side shields 7AG, 7AD has for result that, in addition to its perfectly aerodynamic shape, its centre of gravity is placed in its front part, which gives a perfectly stable unit, similar to a weathercock, the resultant of the dynamic efforts being applied in front of the centre of gravity.

In order to obtain this result, it is to be noted that the rear part of the vehicle has been especially studied in this respect (see FIGS. 1 and 2), that, on the one hand, the last two glass windows 20AG and 20AD form between them a semi-vertical ridge 21 and that, on the other hand, the stream-linings 2BG, 2BD of the rear wheels end in vertical ridges 22BG, 22BD and form important ailerons, sources of a very efficient stability of the vehicle, in particular against the pernicious action of leading winds, which are the cause of numerous inexplicable accidents arising when driving along a perfectly straight road.

Figure 6:
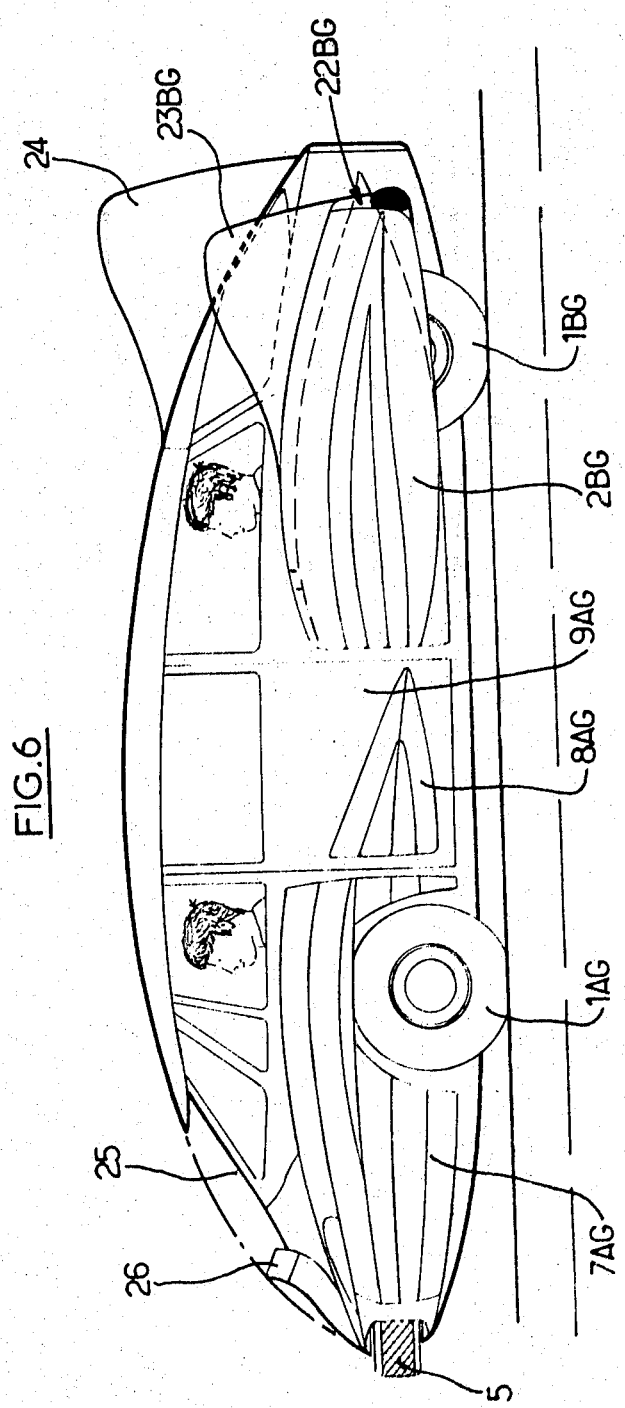
FIG. 6 is a view in elevation of a modified embodiment of a vehicle according to the invention.

For extremely rapid cars, this shape may further be improved by providing (see FIG. 6) three light ailerons, viz.: two side ailerons such as 23BG, respectively placed above the stream-linings 2BG and 2BD of the rear wheels and a central aileron 24 placed above the rear point of the central body of the vehicle.

According to another characteristic of the invention, the base of the front wind-screen 25 is provided with a flange 26 forming a wind-scoop which has for effect to deviate rain and dust away from the wind-screen by simplifying the action of the windscreen wipers in a particularly efficient manner.

Figure 7:
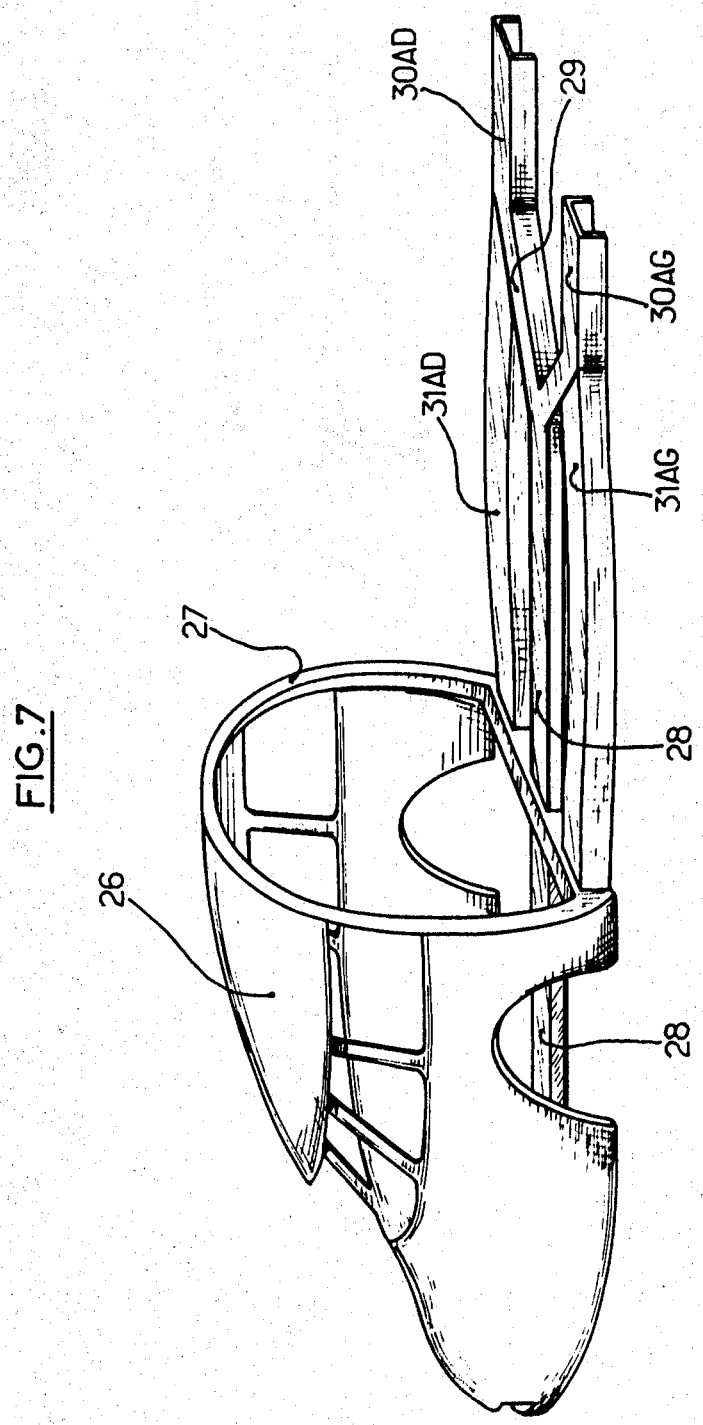
Figure 9:
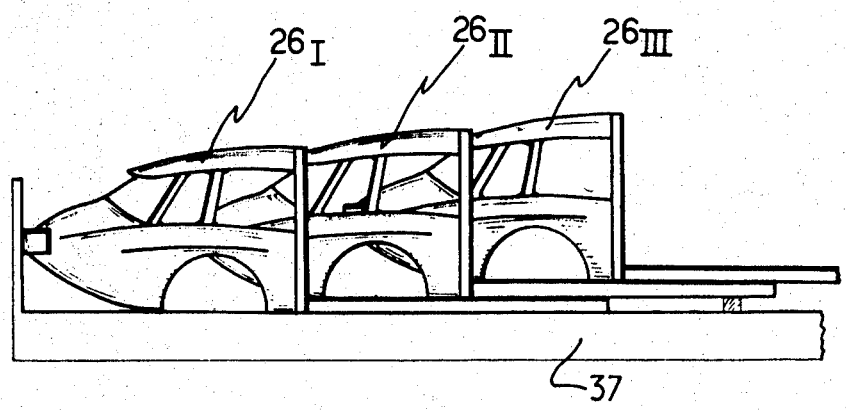
FIG. 9 is an explanatory diagram showing the way in which the front elements of the vehicle may easily be transported on the platform of a trailer or waggon.

The coachwork of the vehicle according to the invention is of a very particular self-carrying monocoque type, in that, as is seen in FIGS. 4, 7, 8 and 9 it is composed of a front element shown in FIG. 7 and a rear element shown in FIG. 8, which may be manufactured in different workshops, easily transported, as will be seen from FIG. 9, to a mounting factory where they are assembled to constitute the unit of FIG. 4.

For the clearness of the drawings, there has only been voluntarily shown in the above mentioned FIGS. the main frame of the coachwork, eliminating all that is not necessary for the comprehension of the principle of the conception of the invention.

In a more detailed manner, the front element is constituted: on the one hand by the whole front compartment of the vehicle 26, up to and including the main stiffening transverse couple 27 to which will be connected the rear element and will hinge the side doors 9 AG, 9AD. It is in this compartment that will be mounted the front seats, the anti-shock spare wheel device, the front train suspension device and the two main protective shields; on the other hand, by the frame-carrying element, consisting essentially (a) of a longitudinal middle box-girder 28, the front part of which extends across the front compartment and serves, amongst other purposes, as an attachment base for the shaft 6 of the anti-shock spare wheel and its reinforced compartment 4. The rear part of this girder 28 opens out at 29 in the shape of a V, the two arms of which are extended by parallel side elements 30AG and 30AD adapted to serve more particularly as a basis of support for the engine 11; (b) of two side box-girders 31AG, 31AD which render solid the stiffening transverse couple 27 at the side arms of the V-opening 29.

The rear element shown in FIG. 8 consists of a frame-work comprising: a front stiffening couple 32, which is fixed by any suitable method to the couple 27 of the front element; an intermediate stiffening couple 33 which is, when the vehicle is assembled, on a level with the rear part of the side doors 9AG, 9AD, this element comprising in its lower part cut away portions 33A, permitting the passage and the attachment on the box-girders 28, 31AG and 31AD of the front element; A rear stiffening couple 34 on which is hinged the rear cover 18 of the luggage boot placed above the engine. This couple comprises moreover two side stay-rods 35 the lower ends of which are secured to the side girders 30AG, 30AD of the front element; a series of longitudinal ties 36 interconnecting the different transverse stiffening couples.

The advantage of manufacturing the car in two main elements capable of being subsequently assembled in a mounting factory is incontestable, in that the elements not yet assembled with their complementary elements may easily be transported encased one inside the other.

It is thus, in particular, that front elements which are the most cumbersome (see FIG. 9) may be encased one within the other on a transport-platform as shown diagrammatically by 37.

The conception of the front element is such that the element $26_{II}$ for example may be fitted inside the element $26_I$, the point of its hood being on a level with the main couple of said element $26_I$. Such is also the case with the element $26_{III}$ inside the element $25_{II}$, and so on. In this manner one is able to place, on a platform 37 of a total length of two vehicles once mounted, seven front elements.

The encasing of the rear elements one within the other does not present any special problem.

The transport of the elements to be assembled from two different manufacturing workshops to a common mounting workshop is thus solved in a particularly simple and efficient manner and permits the application of decentralization principle so much sought after in the present economical system.

In view of the exceptional loading possibilities of the vehicle according to the invention, it is advantageous to provide it with a suspension adjustable at will, both when running and not running.

More particularly still, one will preferably make use of an adjustable suspension of the type object of applicant'French Pat. No. 1,387,858 and to which have been brought various improvements more specially adapted to the particular problem to be solved in the present case.

One has already seen that one of the characteristics of the vehicle according to the invention resides in spacious accommodation space; it is in fact conceived so as to be able easily to contain seven adults or five adults and three or four children. Luggage in the front and rear boots will further increase the movable weight.

The outer dimensions of the vehicle which are relatively small do not lead to a great weight when empty and this, in spite of the very great resistance of the body.

It follows that the total weight with the fuel may exceed 60 percent of the weight when empty.

It is very difficult if not impossible with known suspension devices to obtain satisfactory suspension, both flexible and soft, producing good behaviour on the road, both at low speed and without load and at high speed and full load, of which the latter may reach an increase of the order of 60 percent relative to the minimum load.

This is the result which may be attained by the improved suspension device which will now be described.

For an easy comprehension of the invention, one will first of all recall very succinctly the principle of the adjustable suspension, object of applicant's prior French Pat. No. 1,387,858, referring to FIGS. 10, 11, 12 and 13.

Figure 5:
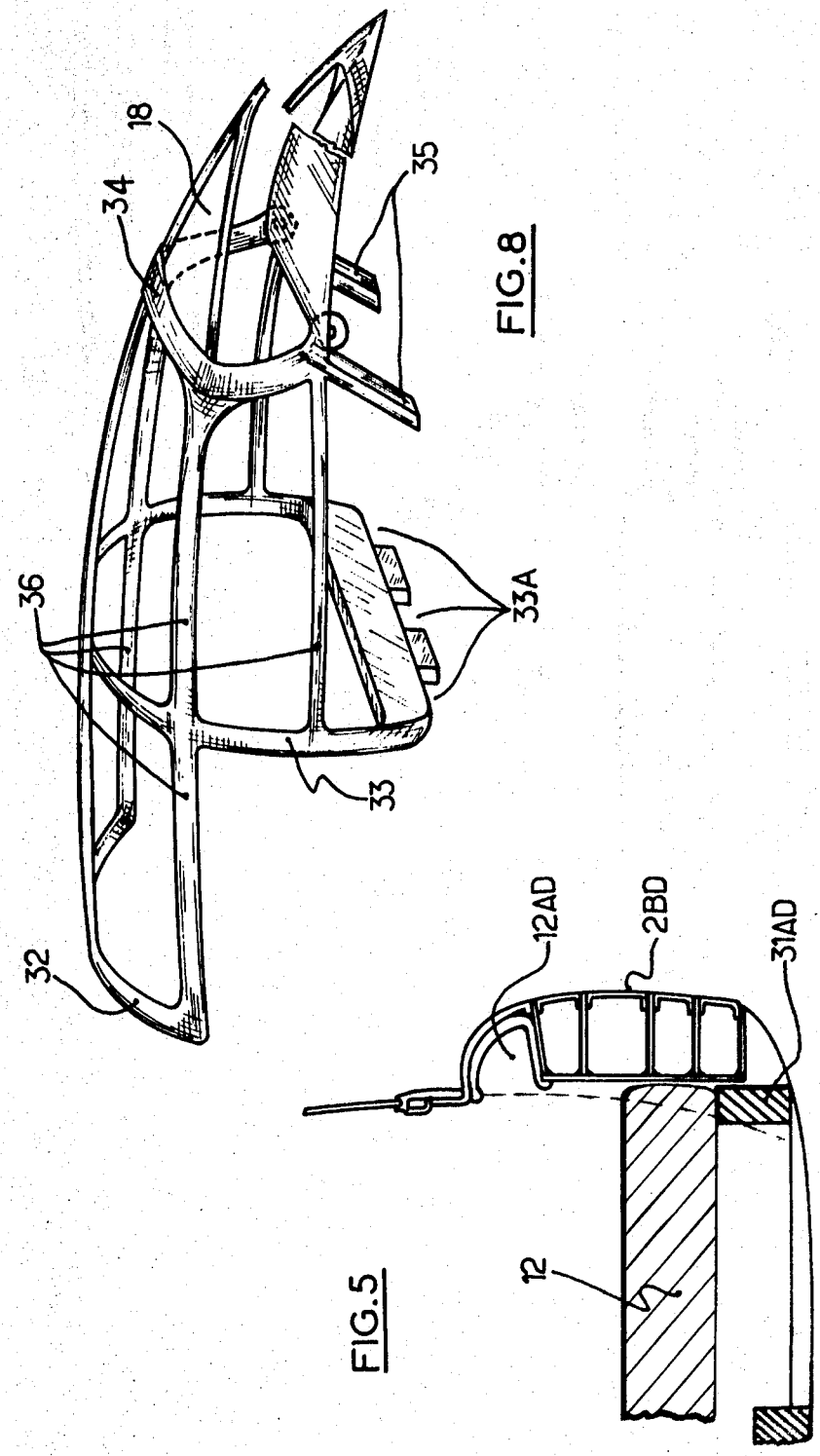
FIG. 5 is a detail view on a larger scale showing in elevational section the rear protective shield.

FIG. 10 is a view in elevational cross section of a possible embodiment of the adjustable suspension device arranged to ensure the suspension of a front wheel, the device being shown in the corresponding to the low position of the vehicle such as the latter is shown for example in FIGS. 1 and 5 and for the position of the wheels 1AG and 1BG which are shown in full lines in FIG. 3.

Figure 11:
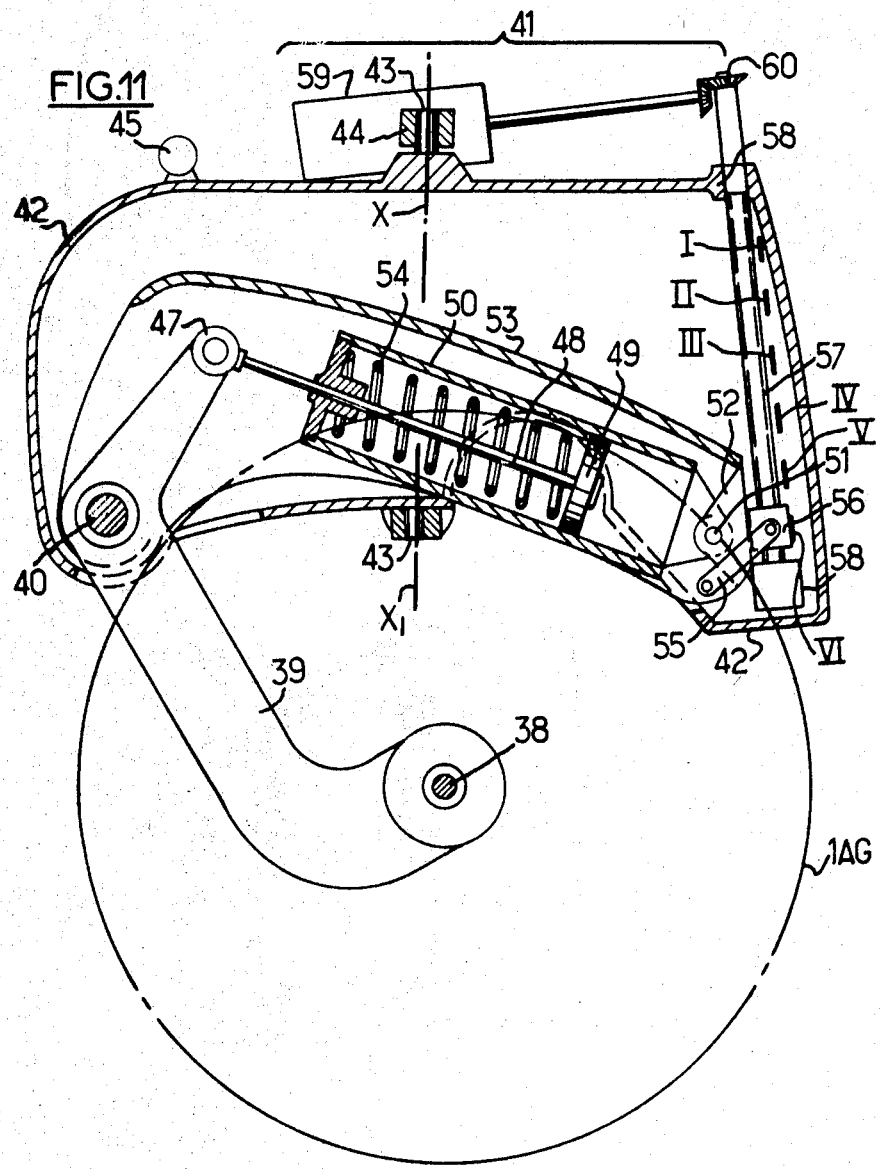
Figure 12:
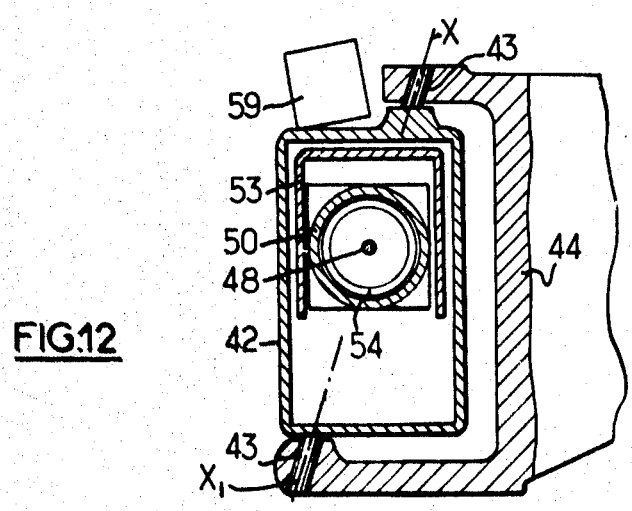
FIG. 12 is a view in partial cross section along line XII–XII of FIG. 10.

FIG. 11 is a view similar to the preceding one, but the device being this time shown in the position corresponding to the raised position of the vehicle in which the wheels occupy the position shown in broken lines in said FIG. 3.

If one considers for example the case of the left front wheel 1AG, this latter is mounted on a journal 38, itself mounted at the end of a lever 39 hinged on a spindle 40 integral with a unit generally designated by the reference 41 which is movable and connected to the steering device for the front wheels and which is stationary and connected to the frame for the rear wheels.

More particularly, this unit 41 comprises a crank-case 42 of elongated shape provided with a pivot 43 rotating at its two ends in a fork-joint 44 rigidly fixed to the coachwork of the vehicle.

It is obvious that, following the characteristics which are desired for the vehicle on which is mounted the unit, one will give the axis $XX_t$ of the pivot the desired angle of inclination and angle of action.

Moreover, the crank-case 42 comprises at its upper end a ball joint 45 which permits of connecting the movable unit 41 thus obtained to the steering gear, one rod 46 of which is shown in dot and dash lines in FIG. 13.

The lever 39 is prolonged beyond the pivoting spindle 40 by a bent part substantially at right angles and the end of which is hinged to a fork-joint 47 fixed at the end of the rod 48 of a piston 49 which may slide in a cylinder 50. This latter is hinged at its free end to a spindle 51 mounted in a fork-joint 52 integral with an inverted U-shaped lever 53 surrounding the cylinder 50 and the extension of the lever 39, said lever 53 being hinged at its front end to the pivoting spindle 40 of the lever 39 carrying the journal 38 of the wheel 1AG. It is to be noted that the pivoting spindle 40 is disposed so as to be perpendicular to the longitudinal axis of the vehicle when the latter moves in a straight line.

Inside the cylinder 50 is housed a spring 54 between the front end of the cylinder traversed by the rod 48 and the piston 49. The unit 47-48-49-50-54 which has just been described allows the spring 54 to play the role of a flexible deforming element of the lever 39 carrying the wheel 1AG, it being understood that it may advantageously be completed by the variable flexiblity device shown by way of example in FIG. 16 and which will be referred to in detail further on.

Figure 15:
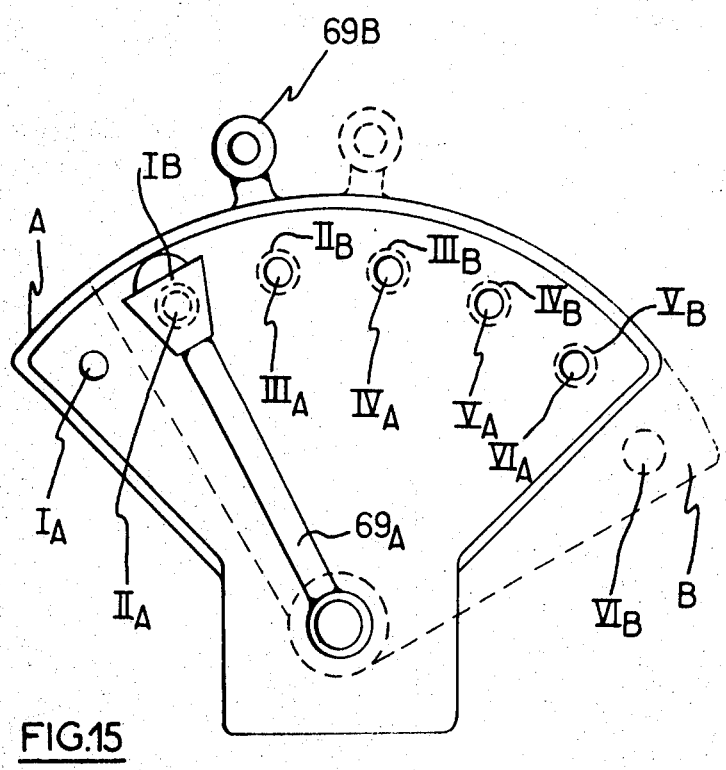
FIG. 15 is a detail view showing very diagrammatically a manual control device permitting of adjusting the utilization area of the suspension devices, as a function of the load of the vehicle.

According to a characteristic of the invention which will be described in detail hereafter with reference to FIGS. 14 and 15, the driver may at will pivot the assembly of wheel carrying lever and elastic element about the shaft 40, for example to transfer it from the position shown in FIG. 10 to the position shown in FIG. 11, these positions respectively corresponding to the maximum low position of the vehicle shown in full lines in FIG. 3, to the maximum raised position shown in broken lines in the same FIG., or again to an intermediate position. It is to be noted that in FIG. 10 the spring of the elastic deformable unit is compressed while it is nearly completely loosened in the case of FIG. 11.

The pivoting of the lever 53 about the shaft 40 may be realized as shown by way of example in the drawings, that is to say electro-mechanically. To this end, the rear end of the lever 53 is connected by connecting links 55 to a nut 56 disposed on a threaded rod 57 which may rotate in bearings 58 integral with the crank-case 42. An electric motor 59 of low power, but capable of rotating very rapidly, is fixed to the casing 42 and gears with the threaded rod 57 through the agency of a bevel gear 60. It will immediately be seen that by actuating the electric motor in one direction or the other, one produces the raising or lowering of the nut 56 and, consequently, the pivoting of the lever 53 about the shaft 40. On the other hand, one may arrest the lever 53 in any one of the intermediate positions by stopping the motor 59.

Figure 14:
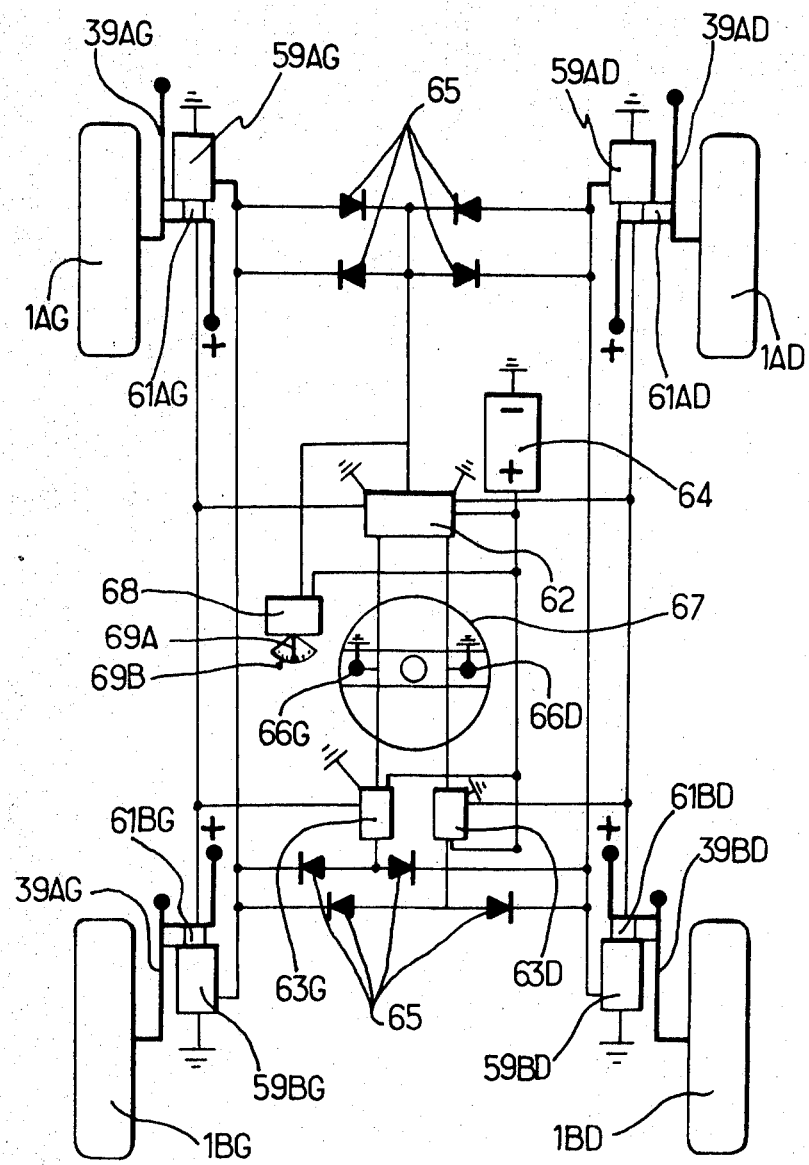
FIG. 14 is an electric wiring diagram of the control of the four suspension devices of FIGS. 10 to 13.

The control of the electric motors actuating the mechanical jacks regulating the suspensions of each of the wheels of the vehicle is preferably effected by a device the block diagram of which is shown in FIG. 14.

In order to simplify the reading of said diagram, one has provided all the references to the left side of the vehicle with the sign G and to the right side of the vehicle with the sign D. Moreover, one has designated the two front suspension devices by the general references 39AG and 39AD and the two rear devices by the general references 39BG and 39BD, it being understood that each of the said suspension devices is of the type of FIGS. 10 to 13, as such for the front wheels, and without the pivoting spindle 43, 44 of the device for the rear wheels.

Referring at the same time to FIGS. 10 and 11, one will first of all recall that the electric motors 59 rotate in one direction or the other according as to whether they are fed in + or −. On the other hand, when the nut 56 moves on the screw 57 and reaches one of the two extreme positions: low FIG. 10) and high (FIG. 11), it actuates corresponding circuit breakers designated by I and VI. Moreover, intermediate circuit breakers II, III, IV and V are placed on the path of the nut 21 and regarding the role of which reference will be made hereafter.

The different groups of circuit breakers I to VI are schematized in FIG. 14 by the respective general references 61AG, 61AD, 61BD. They are electrically connected to three control relays 62, 63G and 63D to which one will refer hereunder. The electric installations finally comprises a battery of accumulators 64, diodes 65, two control pushbutton 66G and 66D placed on the steering wheel 67, and a manual control device 68 to which reference will be made hereafter. More particularly, the three relays 62, 63G and 63D are reversers of the impulse and adhering type, that is to say that:

1. Under the effect of an electric control impulse, they occupy a position in which they allow the current to pass in the direction + −, then, under the effect of a new impulse in the direction − +, and so on.
2. They remain in the position in which they have been brought until they receive a new control impulse.

The control pulses of said relays are given by the contacts 66G or 66D placed on the wheel and which are actuated, either selectively as regards the relays 63G and 63D, or simultaneously for the relay 62, which latter comprises to this end a conventional gate "ET".

Moreover, the circuit breakers 61AG and 61AD are connected to said relays so that when said circuit breakers are actuated, as has previously been seen, by the movement of the nut 56 along the screw 57 of the jacks, they eliminate the adherence of the relays and bring the latter into an intermediate neutral position in which they do not allow the current to pass in either direction. To obtain again the passage of the current, the relays must necessarily be subjected to a new control impulse by the contact or contacts 66G, 66D placed on the wheel.

Due to the above electric wiring, one obtains the following control possibilities:

1. The contact 66D placed on the wheel actuated alone, brings about the raising of the vehicle, left hand side, and the lowering of the vehicle, right hand side.
2. The contact 66G placed on the wheel actuated alone, brings about the raising of the vehicle, right hand side, and the lowering of the vehicle, left hand side.

3. When the vehicle is in an inclined position to the right or to the left, one of the two contacts of the wheel brings about, when it is actuated, the return of the vehicle to its initial horizontal position.

4. The two contacts of the wheel actuated simultaneously bring about, when the vehicle is in the horizontal low position, its rapid rise to the maximum raised position and vice versa.

The placing of the vehicle in any basic intermediate horizontal position is realized by the manual control 68, essentially consisting (see also FIG. 15) of a stationary plate A and of a movable plate B, the two comprising respective contact $I_A, I_B ... VI_A, VI_B$, of a lever 69A which may pass successively over the contact studs $I_A... VI_A$, and a lever 69B permitting of shifting the contact studs $I_B ...VI_B$ relative to contact studs $I_A ...VI_A$ are electrically connected to the contacts I to VI of the suspension devices of the wheels of fig. 10 and 11, whereas the earthing is effected through the agency of the contact studs $I_B$ to $VI_B$ of the control device 68.

The contacts I to VI of the suspension devices correspond to six different heights from the ground of the vehicle, viz.:
for contact I, the very low position;
for contact II the speedway position;
for contact III, the road position;
for contact IV, the position for ground tracks;
for the contact V, the very high position;
for the contact VI, the maximum high position.

By operating the lever 69B, the driver may alter the whole adjustment of the vehicle, the position II or III becoming for example the original position I.

All these manual controls may be completed by, or combined with, or even replaced by automatic controls. Firstly, a lever hinged transversely like a pendulum may, at the beginning of a turning, cause the car to incline as has been described above. In this case, the centrifugal force inclining the pendulum, the latter will actuate contacts similar to those of the steering wheel 66G or 66D.

Moreover, a device of the same kind may automatically harden the suspension of the front train if it has a tendency to flatten following sudden braking.

This possibility of shifting the area permits of utilizing under the most favourable conditions the vehicle either empty, or with full load which, as has been already seen, may attain an increase of 60 percent by weight relative to empty load.

Figure 16:
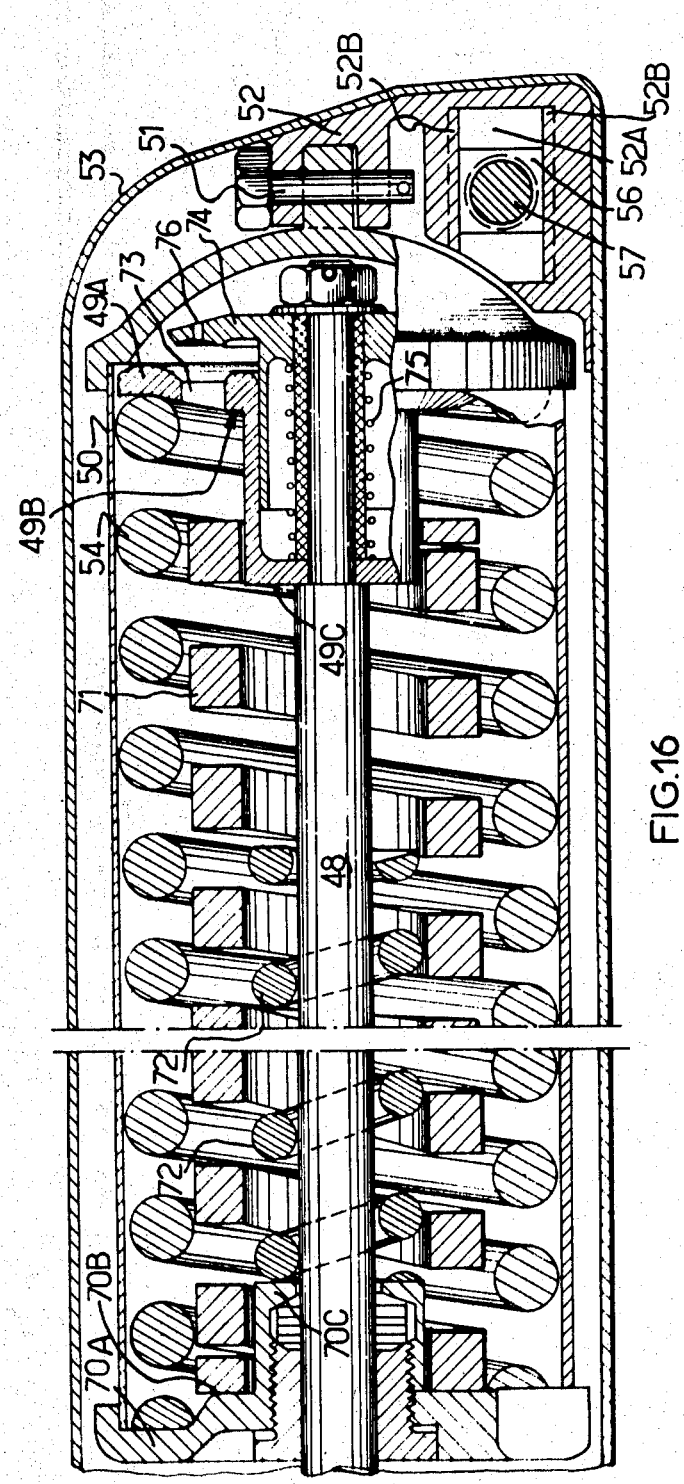
FIG. 16 is a detail view in longitudinal section on a larger scale of the elastic system proper of the suspension device to give it variable flexibility.

In order to possess in all the adjustment possibilities of the vehicle a suspension device which is always as flexible and soft, one may advantageously complete the single spring 54 of FIGS. 10 and 11 by a variable flexibility device, such as the one shown by way of example in FIG. 16.

In this case, the spring 54 which bears on the outer part 70A of the front cover of the cylinder 50 and the outer part 49A of the piston connected to the rod 48 is duplicated by: a second shorter middle spring 71 bearing on the middle 70B of the cover and capable of entering into contact with the middle part 49B of the piston when the spring 54 is sufficiently compressed; a third spring 72, shorter than the spring 71, bearing against a central shoulder 70C of the cover and capable of entering into contact with a middle shoulder 49C of the piston when the springs 54 and 71 are sufficiently compressed.

It will readily be seen that the elastic resistance of the device is all the more important as the piston 49 is more advanced towards the left of the FIG.

In order to avoid racquet blows resulting from sudden returns of the elastic deformable device to its initial position, there is provided the hydraulic compensating device hereafter described.

The piston 49 comprises in its thickness a certain number of openings 73 covered by an annular valve 74 urged towards its closed position by a traction spring 75. Calibrated orifices 76 are provided in the valve 74 and correspond to the openings 73, establishing communication between the two faces of the piston 49. The body of the cylinder 50 is filled with a liquid having a viscosity independent of the temperature, so that when the piston 49 is moved from right to left of the FIG. the pressure of the liquid forces the valve 74 against the action of the spring 75 and the liquid passes almost freely from one face to the other of the piston 49 through the large openings 73 of the latter.

On the contrary, when the spring or springs 54, 71 and 72 relax, the movement of the piston 49 from left to right brings about the closing of the valve 74 and the liquid may no longer pass from one face to the other of the piston 49 except through the small calibrated orifices 76. The result is thus a slowing down of the displacement speed of the piston 49 and, consequently, a progressive braking upon release of the springs.

There is thus indeed a braking in the two directions of movement of the piston 49 and an efficient damping of the oscillations.

As is also seen in FIG. 16, the relative movement between the nut 56 adapted to the rod 57 and the support 52 integral with the lever 51 is realized in this case by the possibility of longitudinal sliding of said nut 56 in a slot 52A of the support 52 provided with guiding grooves 52B.

It is obvious that the present invention has been described only in an explanatory but by no means limitative manner and that changes in detail may be made therein, in conformity with its spirit, without coming out of the scope of said invention.

I claim:
1. A high safety motor vehicle comprising in combination:
a body of tapered shape having a well rounded front part, both in the horizontal plane and in the vertical plane, and a master couple placed substantially in the first third of the total length of the vehicle;
a vertical shaft firmly fixed to the frame of the vehicle on which is mounted the spare wheel which occupies the front end of the body;
the said spare wheel being combined with two very strong and resistant shields, in the horizontal plane, smooth and devoid of asperities;
two front wheels combined with the front rounded part as a unit of the vehicle;
two rear wheels separate from the rear tapered part and housed in side stream-linings connected to and combined with the whole by means of shaped appendages;
two front seats placed slightly in front of the immaterial axis joining the centres of the two front wheels and, in the two remaining thirds of the length of the vehicle, at least two folding seats placed in the central part and a seat placed very far back;
a driving engine placed in front of the axles of said rear wheels;
two side doors to accede to the central platform; and
at least one door placed to the fore, rising upwardly and bringing with it the half of the windscreen, in order to accede to the front seats.

2. A motor vehicle according to claim 1, in which are provided two luggage boots, one at the front end, above the spare wheel, the other at the rear end above the engine compartment, it being possible to accommodate a considerable amount of luggage in the space of the folding seats when these are folded back.

3. A motor vehicle according to claim 1, in which the aerodynamism is reinforced by the fact that the two rear glass windows of the coachwork form between them a semivertical ridge, whereas the stream-linings of the rear wheels end in vertical ridges.

4. A motor vehicle according to claim 3, in which the aerodynamic stability, for extremely rapid vehicles, is further improved by means of three light ailerons two of which are disposed above the stream-linings of the rear wheels and one above the rear point of the central body of the vehicle.

5. A motor vehicle according to claim 1, in which is provided a suspension adjustable at will permitting of utilizing to the maximum the possibilities of variations in the load transported which may attain an increase of the order of 60 percent of the weight at full load relative to the weight when empty, the said adjustable suspension device occupying, between its two extreme high and low positions, a certain number of intermediate positions corresponding to various possible uses of the vehicle, these different positions being ensured by contactors electrically connected to contact studs of a stationary element along which the driver may move a small control lever, earthing being effected by a similar group of contact studs in engagement with the first of a movable element which the driver may move relative to the stationary element by means of a second handle, which has for effect to modify the area of the possible adjustments of the suspension in function of the load of the vehicle.

6. A motor vehicle according to claim 5, in which an automatic pendulum device controls the adjustable suspension device in turnings and upon braking.

7. A motor vehicle according to claim 1, in which the coachwork of the vehicle consists of two complementary separate elements: one front element and one rear element which may be manufactured in different factories, then transported in a particularly easy manner and, finally, mounted in an assembly workshop.

8. A motor vehicle according to claim 7, in which the front element of the coachwork includes the front compartment up to and including the main couple as well as the substructure of the rear element, which permits of easily transporting half a dozen encased one in the other on the platform of a trailer or of a wagon.